US010023063B2

(12) United States Patent
Geo

(10) Patent No.: US 10,023,063 B2
(45) Date of Patent: *Jul. 17, 2018

(54) LOCATION-BASED ELECTRIC POWER MEDIATION MODULE, ELECTRIC VEHICLE, MEDIATION SERVER, AND USER CERTIFICATION SOCKET OR CONNECTOR

(71) Applicant: GEO-LINE CO., LTD., Ansan, Gyeonggi-do (KR)

(72) Inventor: Sung Gyoo Geo, Seoul (KR)

(73) Assignee: GEO-LINE CO., LTD., Ansan, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,686

(22) Filed: Oct. 16, 2017

(65) Prior Publication Data

US 2018/0037129 A1 Feb. 8, 2018

Related U.S. Application Data

(63) Continuation of application No. 14/878,200, filed as application No. PCT/KR2014/002877 on Apr. 3, 2014, now Pat. No. 9,821,675.

(30) Foreign Application Priority Data

Apr. 8, 2013 (KR) .................. 10-2013-0038225
Feb. 14, 2014 (KR) .................. 10-2014-0017026

(51) Int. Cl.
*H02J 7/00* (2006.01)
*B60L 11/18* (2006.01)
(Continued)

(52) U.S. Cl.
CPC ....... *B60L 11/1846* (2013.01); *B60L 11/1816* (2013.01); *B60L 11/1818* (2013.01);
(Continued)

(58) Field of Classification Search
CPC ..................................................... Y02T 90/14
(Continued)

(56) References Cited

U.S. PATENT DOCUMENTS

2010/0037057 A1* 2/2010 Shim .................. H04L 63/0823
713/171
2010/0277121 A1* 11/2010 Hall ...................... B60L 11/182
320/108
(Continued)

FOREIGN PATENT DOCUMENTS

JP 2010-259308 4/2009

OTHER PUBLICATIONS

Office Action dated Mar. 13, 2018 for JP Patent Application No. 2016-506240.

*Primary Examiner* — Yalkew Fantu
(74) *Attorney, Agent, or Firm* — Mintz Levin Cohn Ferris Glovsky and Popeo, P.C.; Kongsik Kim; Derek E. Constantine

(57) ABSTRACT

The present invention relates to a location-based charging/discharging power mediation system of an electric vehicle, and more particularly to a module, an electric vehicle, and an intermediate server for location-based charging/discharging power mediation. The present invention also relates to a user authentication socket or connector used in the power mediation system. A module for location-based power mediation comprises: a location and time identification unit that identifies a location and a time of an electric vehicle from one or more of information from a global navigation satellite system, Local Positioning System (LPS) information, and earth magnetic field information; a power measurement unit that monitors input/output power to/from the electric vehicle in real time; and a wireless communication unit that transmits location and time information of the electric vehicle and information on the input/output power to (Continued)

the outside. An electric vehicle power mediation subscriber charges/discharges a battery of the electric vehicle through a building of a power subscriber by inserting a plug of the electric vehicle into a socket of the building of the power subscriber. A location of the building and the power subscriber are identified by transmitting the location and time information of the electric vehicle.

20 Claims, 10 Drawing Sheets

(51) Int. Cl.
    *H01R 13/66* (2006.01)
    *G06Q 50/06* (2012.01)
(52) U.S. Cl.
    CPC ....... *B60L 11/1842* (2013.01); *B60L 11/1848* (2013.01); *B60L 11/1881* (2013.01); *G06Q 50/06* (2013.01); *H01R 13/665* (2013.01); B60L 2240/70 (2013.01); B60L 2250/20 (2013.01); Y02E 60/721 (2013.01); Y02T 10/7072 (2013.01); Y02T 10/7291 (2013.01); Y02T 90/121 (2013.01); Y02T 90/128 (2013.01); Y02T 90/14 (2013.01); Y02T 90/16 (2013.01); Y02T 90/163 (2013.01); Y02T 90/168 (2013.01); Y02T 90/169 (2013.01); Y02T 90/34 (2013.01); Y04S 10/126 (2013.01); Y04S 30/12 (2013.01); Y04S 30/14 (2013.01)
(58) Field of Classification Search
    USPC ............ 320/109, 107, 104; 180/65.1, 65.21; 307/10.1; 701/22
    See application file for complete search history.

(56) References Cited

U.S. PATENT DOCUMENTS

| 2010/0306033 | A1  | 12/2010 | Oved et al. | |
|---|---|---|---|---|
| 2012/0109797 | A1* | 5/2012 | Shelton | B60L 3/0069 705/34 |
| 2012/0217928 | A1* | 8/2012 | Kulidjian | B60L 3/0069 320/109 |
| 2014/0028255 | A1* | 1/2014 | Brimacombe | B60L 11/1824 320/109 |
| 2015/0202976 | A1* | 7/2015 | Bridges | B60L 11/1842 320/109 |

* cited by examiner

LOCATION-BASED ELECTRIC POWER MEDIATION MODULE, ELECTRIC VEHICLE, MEDIATION SERVER, AND USER CERTIFICATION SOCKET OR CONNECTOR

CROSS REFERENCE TO RELATED APPLICATIONS

This application is continuation of U.S. application Ser. No. 14/878,200 filed on Oct. 8, 2015, which is a continuation application of International Application No. PCT/KR2014/002877 filed on Apr. 3, 2014, which claims priority to Korean Application No. 10-2013-0038225 filed on Apr. 8, 2013 and Korean Application No. 10-2014-0017026 filed on Feb. 14, 2014. The applications are incorporated herein by reference.

TECHNICAL FIELD

The present invention relates to a location-based charging/discharging power mediation system of an electric vehicle and a user authentication socket or connector used in the power mediation system, and more particularly to a module, an electric vehicle and a mediation server for a location-based electric power mediation and to a user certification socket or connector that receives authentication power from the outside.

BACKGROUND ART

An electric vehicle refers to an electrical connection type vehicle that receives and stores external power to use it in driving of the vehicle. Electrical connection type vehicles include a plugin hybrid vehicle, a battery vehicle, and a fuel cell vehicle. In recent years, due to the depletion of fossil energy and the environmental contamination, the demands on electric vehicles that use electrical energy have increased and the studies on them also have become more active. An electric vehicle generally stores electrical energy in a battery and is driven by rotating an electrical motor using the electrical energy, and the battery needs to be continuously charged because the capacity of the battery is limited. Accordingly, it is essential to charge the battery of the electric vehicle similar to fueling an existing combustion engine vehicle at a gas station, and thus it is necessary to construct a charging system for the battery of the electric vehicle.

In this regard, Korean Patent Application Publication No. 10-2012-0109914 discloses a charging system of an electric vehicle that may be most general. According to the charging system of an electric vehicle, for example, power may be charged in the electric vehicle in association with an existing power network such as a city railroad power network. However, the charging system requires a separate fixed charging unit that may receive power from a power network and provide the power to an electric vehicle. Furthermore, the user needs to pay an electric fee at the very place where the fixed charging unit is provided after the battery of the electric vehicle is charged.

Meanwhile, Korean Patent Application Publication No. 10-2012-0012922 discloses a charging fee accounting system of an electric vehicle that may improve convenience and stability during a charging operation by attaching a charging fee accounting unit in the electric vehicle. According to the charging fee accounting system, because a charging station should be installed on a road surface even though the charging fee accounting unit is attached to the electric vehicle instead of a charging station on a road surface, enormous facility costs are required.

Accordingly, a charging system of an electric vehicle that may be conveniently used by the user of the electric vehicle while facility costs for charging and discharging the electric vehicle are reduced and may mediate a power price such that power may be purchased or sold between a power subscriber, a power sale company and the user of the electric vehicle is required.

Furthermore, an electric vehicle sometimes needs to receive power from a place that is not owned by the owner of the electric vehicle. For this reason, feeding units, such as a socket equipped with a user authentication function, a multi-tab, and an electric vehicle charger, for example, which allows the owner of an electric vehicle to connect the electric vehicle to a socket in a place that is not owned by the owner of the electric vehicle, for example, in a basement parking lot of an apartment complex to supply power to the electric vehicle. However, according to the feeding units, components for user authentication themselves consume power (hereinafter, standby power) during a standby operation. Furthermore, according to the existing feeding units, a person (for example, the owner of a building) who pays costs for the standby power may not coincide with the actual user (for example, the owner of an electric vehicle).

SUMMARY

The present invention has been made in an effort to solve the above-mentioned problems, and provides a module, an electric vehicle, and an intermediate server for location-based power mediation that can charge and discharge an electric vehicle without installing a separate fixed unit for charging and discharging the electric vehicle.

The present invention also provides a module, an electric vehicle, and an intermediate server for location-based power mediation that can mediate a power price such that power may be purchased or sold in a fee charging way between a power subscriber and a power sale company, between a power mediation company for an electric vehicle and a power sale company, and between a power mediation company for an electric vehicle and an electric vehicle power mediation subscriber in a location-based charging/discharging power mediation system of an electric vehicle in which a separate fixed unit for charging and discharging an electric vehicle is not installed.

The present invention also provides a user authentication socket or connector that can be used in a location-based power mediation system and does not consume standby power while maintaining security.

The present invention also provides a power mediation connector for receiving power from a user authentication socket or connector that does not consume standby power while maintaining security and for supplying the received power to a power demand unit.

The present invention also provides an electric vehicle for receiving power from a user authentication socket or connector that does not consume standby power while maintaining security.

The objects of the present invention are not limited to the above-mentioned ones, and the other unmentioned objects will be clearly understood by those skilled in the art to which the present invention pertains from the following description.

In accordance with an aspect of the present invention for a module for location-based power mediation, a module for location-based power mediation comprises: a location and time identification unit that identifies a location and a time of an electric vehicle from one or more of information from a global navigation satellite system, Local Positioning System (LPS) information, and earth magnetic field information; a power measurement unit that monitors input/output power to/from the electric vehicle in real time; and a wireless communication unit that transmits location and time information of the electric vehicle and information on the input/output power to the outside. An electric vehicle power mediation subscriber charges/discharges a battery of the electric vehicle through a building of a power subscriber by inserting a plug of the electric vehicle into a socket of the building of the power subscriber. A location of the building and the power subscriber are identified by transmitting the location and time information of the electric vehicle.

In the aspect of the module, the information on input/output power comprises one or more of power connection time information of the electric vehicle, an input/output record of power, and accumulated driving distance information so that an electric fee for the identified power subscriber is calculated.

In the aspect of the module, the wireless communication unit transmits a charging/discharging event log to the outside in real time and retransmits all charging/discharging event logs from a time point when a plug of the electric vehicle is connected to a time point when the plug is separated to the outside so that the charging/discharging event log transmitted in real time is verified.

In the aspect of the module, the electric vehicle comprises an ID reader mounted on a plug of the electric vehicle, and the ID reader detects an ID attached to a socket of the building.

In the aspect of the module, the location and time identification unit identifies a location and a time of the electric vehicle additionally based on a sensor signal from one or more of a gravity sensor and an acceleration sensor, in addition to one or more of information from a global navigation satellite system, LPS information, and earth magnetic field information.

In accordance with an aspect of the present invention for an electric vehicle, an electric vehicle comprises: a location and time identification unit that identifies a location and a time of an electric vehicle from one or more of information from a global navigation satellite system, a Local Positioning System (LPS) information, and earth magnetic field information; a power measurement unit that monitors input/output power to/from the electric vehicle in real time; and a wireless communication unit that transmits location and time information of the electric vehicle and information on the input/output power to the outside. An electric vehicle power mediation subscriber charges/discharges a battery of the electric vehicle through a building of a power subscriber by inserting a plug of the electric vehicle into a socket of the building of the power subscriber. A location of the building and the power subscriber are identified by transmitting the location and time information of the electric vehicle.

In accordance with an aspect of the present invention for an intermediate server for location-based power mediation, an intermediate server for location-based power mediation identifies a location of a building of a power subscriber and the power subscriber by receiving location and time information of an electric vehicle whose plug is inserted into a socket of the building for charging/discharging a battery of the electric vehicle. The intermediate server calculates an electric fee for the electric vehicle by receiving one or more of power connection time information of the electric vehicle, an input/output record of power, and accumulated driving distance information. The location and time information of the electric vehicle is based on one or more of information from a global navigation satellite system, LPS information, and earth magnetic field information.

In the aspect of the intermediate server, the intermediate server transmits a power mediation record comprising one or more of the power connection time information, the power input/output record, and the accumulated driving distance information to the outside so that an electric fee for the identified power subscriber is calculated based on the power mediation record.

In aspect of the intermediate server, the intermediate server commands a charging/discharging operation of the electric vehicle according to one or more of residual battery level information received from the electric vehicle, central control information in accordance with a change in demand on power, or a condition of a contract with an electric vehicle power mediation subscriber made in advance.

In the aspect of the intermediate server, the intermediate server receives a charging/discharging event log from the electric vehicle in real time, and receives all charging/discharging event logs from a time point when a plug of the electric vehicle is connected to a time point when the plug is separated to verify the charging/discharging event log received in real time.

In the aspect of the intermediate server, the intermediate server further receives an ID attached to a socket of the building detected by an ID reader mounted on a plug of the electric vehicle.

In the aspect of the intermediate server, the location and time information of the electric vehicle is additionally based on a sensor signal from one or more of a gravity sensor and an acceleration sensor, in addition to one or more of information from a global navigation satellite system, LPS information, and earth magnetic field information.

In accordance with an aspect of the present invention for a user authentication socket or connector, a user authentication socket or connector comprises: an authentication terminal that receives authentication power and a socket operation secret code for authentication of a user; and an authentication unit that is operated by the authentication power and determines whether the socket operation secret code corresponds to socket ID information. The authentication power is supplied from the outside via the authentication terminal. Power for an electric vehicle is supplied from a main power source to the outside if the socket operation secret code corresponds to the socket ID information. A location of the socket or connector and a power subscriber are identified based on location and time information of the electric vehicle. The location and time information of the electric vehicle is based on one or more of information from a global navigation satellite system, LPS information, and earth magnetic field information.

In the aspect of the user authentication socket or connector, the socket or connector receives a socket ID request signal from the outside via the authentication terminal and transmits socket ID information to the outside.

In the aspect of the user authentication socket or connector, if a plug is separated from the socket or connector, supply of authentication power through the authentication terminal is ended so that supply of power from the main power source is interrupted.

In accordance with another aspect of the present invention for a user authentication socket or connector, a user authentication socket or connector comprises: a power line communication modem that receives authentication power and a socket operation secret code for authentication of a user; and an authentication unit that is operated by the authentication power and determines whether the socket operation secret code corresponds to socket ID information. The authentication power is supplied from the outside through power line communication. Power for an electric vehicle is supplied from a main power source to the outside if the socket operation secret code corresponds to the socket ID information. A location of the socket or connector and a power subscriber are identified based on location and time information of the electric vehicle. The location and time information of the electric vehicle is based on one or more of information from a global navigation satellite system, LPS information, and earth magnetic field information.

In the another aspect of the user authentication socket or connector, the socket or connector receives a socket ID request signal from the outside via the power line communication modem and transmits socket ID information to the outside.

In the another aspect of the user authentication socket or connector, if a plug is separated from the socket or connector, supply of authentication power through the power line communication modem is ended so that supply of power from the main power source is interrupted.

In accordance with an aspect of the present invention for a power mediation connector, a power mediation connector receives power from a user authentication socket or connector and supplies the power to an electric vehicle. The user authentication socket or connector comprises: an authentication terminal that receives authentication power and a socket operation secret code for authentication of a user; and an authentication unit that is operated by the authentication power and determines whether the socket operation secret code corresponds to socket ID information. The power mediation connector comprises: a battery for supplying the authentication power to the authentication unit; a communication unit for transmitting the socket operation secret code to a socket side; and a power measurement unit for measuring power supplied from the socket. The authentication power is supplied from the outside via the authentication terminal. Power for an electric vehicle is supplied from a main power source to the outside if the socket operation secret code corresponds to the socket ID information. A location of the socket or connector and a power subscriber are identified based on location and time information of the electric vehicle. The location and time information of the electric vehicle is based on one or more of information from a global navigation satellite system, LPS information, and earth magnetic field information.

In the aspect of the power mediation connector, the power mediation connector further comprises: an AC/DC converter for converting the power previously measured through the power measurement unit into DC power to charge the battery or to provide the converted DC power to the user authentication socket as authentication power.

In accordance with another aspect of the present invention for an electric vehicle, an electric vehicle receives power from a user authentication socket or connector wherein the user authentication socket or connector comprises: an authentication terminal that receives authentication power and a socket operation secret code for authentication of a user; and an authentication unit that is operated by the authentication power and determines whether the socket operation secret code corresponds to socket ID information. The electric vehicle comprises: a battery for electric parts, for supplying the authentication power to the authentication unit; a communication unit for transmitting the socket operation secret code to a socket; and a power measurement unit for measuring power supplied from the socket. The authentication power is supplied from the outside via the authentication terminal. Power for an electric vehicle is supplied from a main power source to the outside if the socket operation secret code corresponds to the socket ID information. A location of the socket or connector and a power subscriber are identified based on location and time information of the electric vehicle. The location and time information of the electric vehicle is based on one or more of information from a global navigation satellite system, LPS information, and earth magnetic field information.

In accordance with another aspect of the present invention for a power mediation connector, a power mediation connector receives power from a user authentication socket or connector and supplies the power to an electric vehicle. The user authentication socket or connector comprises: a power line communication modem that receives authentication power and a socket operation secret code for authentication of a user; and an authentication unit that is operated by the authentication power and determines whether the socket operation secret code corresponds to socket ID information. The power mediation connector comprises: a battery for supplying the authentication power to the authentication unit; a communication unit for transmitting the socket operation secret code to a socket; and a power measurement unit for measuring power supplied from the socket. The authentication power is supplied from the outside through power line communication. Power for an electric vehicle is supplied from a main power source to the outside if the socket operation secret code corresponds to the socket ID information. A location of the socket or connector and a power subscriber are identified based on location and time information of the electric vehicle. The location and time information of the electric vehicle is based on one or more of information from a global navigation satellite system, LPS information, and earth magnetic field information.

In the another aspect of the power mediation connector, the power mediation connector further comprises: an AC/DC converter for converting the power previously measured through the power measurement unit into DC power to charge the battery or to provide the converted DC power to the user authentication socket as authentication power.

In accordance with still another aspect of the present invention for an electric vehicle, an electric vehicle receives power from a user authentication socket or connector wherein the user authentication socket or connector comprises: a power line communication modem that receives authentication power and a socket operation secret code for authentication of a user; and an authentication unit that is operated by the authentication power and determines whether the socket operation secret code corresponds to socket ID information. The electric vehicle comprises: a battery for electric parts, for supplying the authentication power to the authentication unit; a communication unit for transmitting the socket operation secret code to a socket; and a power measurement unit for measuring power supplied from the socket. The authentication power is supplied from the outside through power line communication. Power for an electric vehicle is supplied from a main power source to the outside if the socket operation secret code corresponds to the socket ID information. A location of the socket or connector and a power subscriber are identified based on location and time information of the electric vehicle. The location and time information of the electric vehicle is based on one or more of information from a global navigation satellite system, LPS information, and earth magnetic field information.

DETAILED DESCRIPTION

Figure 1:
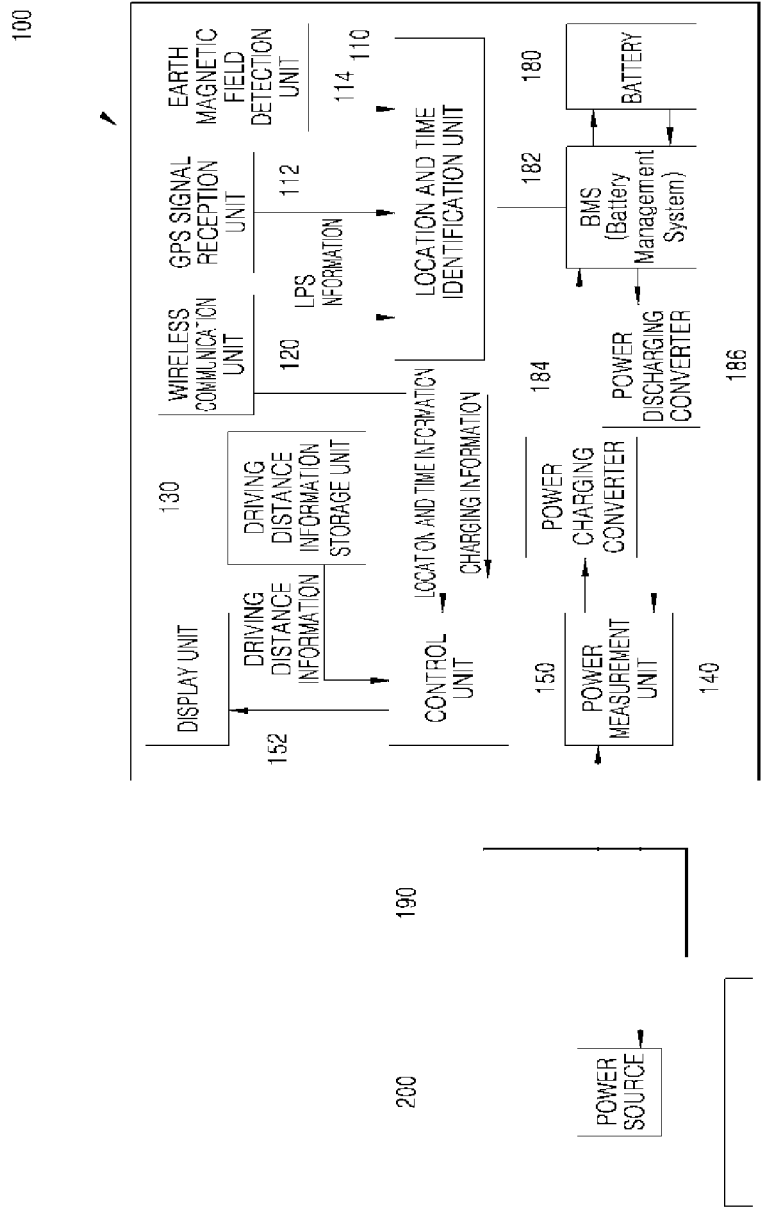
FIG. 1 is a block diagram of an electric vehicle for location-based power mediation according to an embodiment of the present invention.

The above and other aspects, features and advantages of the invention will become apparent from the following description of the following embodiments given in conjunction with the accompanying drawings. However, the present invention is not limited to the embodiments disclosed below, and may be implemented in various forms. The embodiments of the present invention is provided to make the disclosure of the present invention complete and fully inform those skilled in the art to which the present invention pertains of the scope of the present invention. The same reference numerals denote the same elements throughout the specification.

The terms used herein are provided to describe the embodiments but not to limit the present invention. In the specification, the singular forms include plural forms unless particularly mentioned. The terms "comprising" and/or "comprises" used in the specification mean that the mentioned elements, steps, operations, and/or devices do not exclude existence or addition of one or more other elements, steps, operations, and/or devices.

Unless otherwise defined, all terms (including technical and scientific terms) used herein have the same meaning as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

1. Location-based Charging/Discharging Power Mediation System of Electric Vehicle: Module, Electric Vehicle and Intermediate Server for Location-Based Power Mediation In the following description, it will be exemplarily described that a GPS signal receiver receives a GPS satellite signal and a location and a time of an electric vehicle are identified using the GPS satellite signal, but the present invention is not limited thereto. The present invention may generally receive information from all Global Navigation Satellite Systems (GNNSs) and identify a location and a time of an electric vehicle using the information. Examples of global navigation satellite systems include a GPS (Global Positioning System) of the U.S.A., a GLObal NAvigation Satellite System (GLONASS) of Russia, and European Satellite Navigation System (GALILEO) of EU, which have been sequentially commercialized, and China, Japan, and the like are also developing models of their own. Furthermore, in the following description, it will be described that an electric vehicle includes a location and time identification unit, a power measurement unit, a wireless communication unit, and/or an ID reader, but the electric vehicle does not need to necessarily include the component elements. One or more of the component elements may take the form of separate modules. Also, even though the term "module" is used, it does not mean that the component elements form one physically hardware unit and the module may be implemented such that the component elements may be physically separated. The "module" described in the claims covers all forms of modules and the electric vehicle according to the present invention may charge a battery by including or using all the forms of modules.

Referring to FIG. 1, an electric vehicle 100 for location-based power mediation according to an embodiment of the present invention. FIG. 1 is a block diagram of an electric vehicle 100 for location-based power mediation according to an embodiment of the present invention.

The electric vehicle 100 for location-based power mediation according to the present invention may include a location and time identification unit 110, a GPS signal reception unit 112, an earth magnetic field detection unit 114, a wireless communication unit 120, a driving distance information storage unit 130, a power measurement unit 140, a control unit 150, a display unit 152, a battery 180, a battery management system unit 182, a power charging converter 184, a power discharging inverter 186, and a plug 190.

The position and time identification unit 110 may identify a location and a time of the electric vehicle 100 from one or more of a GPS satellite signal, Local Positioning System (LPS) information, and earth magnetic field information.

For example, the GPS satellite signal may be a signal that is received by the GPS signal reception unit 112 included in the electric vehicle 100 and is transmitted to the location and time identification unit 110. The location and time identification unit 110 may identify a location and a current time of the electric vehicle 100 through the GPS satellite signal.

For example, the LPS information may be received from wireless communication base station by the wireless communication unit 120 included in the electric vehicle 100 and may be transmitted to the location and time identification unit 110. In detail, for example, the wireless communication unit 120 may transmit LPS information that is derived from radio waves received from a fixed terrestrial radio wave transmitter such as a mobile phone base station, a terrestrial broadcasting base station, a terrestrial DMB base station, or a wireless LAN access point. The location and time identification unit 110 may identify a location of the electric vehicle 100 through the LPS information.

For example, the earth magnetic field information may be generated by the earth magnetic field detection unit 114 included in the electric vehicle 100 from a signal detected by a geomagnetic sensor in the earth magnetic field detection unit 114, and may be transmitted to the location and time identification unit 110. The location and time identification unit 110 may identify a location of the electric vehicle 100 through the earth magnetic field information.

Although not illustrated in the drawings, the location and time identification unit 110 may identify a location of the electric vehicle 100 based on a sensor signal from one or more of a gravity sensor and an acceleration sensor included in the electric vehicle 100, in addition to one or more of the GPS satellite signal, the LPS information, and the earth magnetic field information, which have been described above.

The location and time identification unit 110 may increase a precision of identifying a location of the electric vehicle 100, a location of a building of a power subscriber, and a power subscriber in various ways by properly combining one or more of the GPS satellite signal, the LPS information, and the earth magnetic field information or additionally based on a sensor signal from one or more of the gravity sensor and the acceleration sensor.

Accordingly, irrespective of a location of the building of the power subscriber, that is, irrespective of a location and an environment of the building where the electric vehicle 100 is charged and discharged, location information whose error is minimized may be provided to a location-based charging/discharging system of the electric vehicle 100. That is, when the building of the power subscriber corresponds to a small-sized building as well as to a large-sized building or an apartment complex, precise location information on the building of the power subscriber may be provided to the location-based charging/discharging system of the electric vehicle 100.

The wireless communication unit 120 may transmit location and time information of the electric vehicle 100 and information on input/output power to the outside. Here, the information on input/output power may include one or more of power connection time information and an input/output record of power of the electric vehicle 100. As will be described with reference to FIG. 2, an electric fee for a power mediation subscriber of an electric vehicle may be imposed or refunded, and an electric fee for an identified power subscriber may be calculated from the information on input/output power.

The wireless communication unit 120 may transmit a charging/discharging event log to the outside in real time, and may retransmit all charging/discharging event logs from a time point when the plug 190 of the electric vehicle 100 is connected to a time point when the plug 190 is separated to the outside. Accordingly, the charging/discharging event log that has been transmitted in real time may be verified.

The wireless communication unit 120 may transmit accumulated driving distance information and charging/discharging record information of the electric vehicle 100 to the outside. Accordingly, it becomes possible to crosscheck the accumulated driving distance information and the charging/discharging record information in order to increase the accuracy of calculation of a charging/discharging electric fee.

The driving distance information storage unit 130 provides vehicle driving distance record information, and various computer modules in the interior of the vehicle, such as a vehicle gauge, a trip computer, an ABS, an ESP, a BCM, and an ECM, may be function as the driving distance information storage unit 130.

The power measurement unit 140 may monitor power input from the outside of the electric vehicle 100 and power output to the outside in real time. The power measurement unit 140 may also detect a power source and interrupt electric power. For example, if the plug 190 of the electric vehicle 100 is inserted into a socket 200 of a building of a power subscriber, the power measurement unit 140 detects a power source. When a power interruption command is received from the control unit 150, power may be prevented from being introduced from a building of a power subscriber to the electric vehicle 100 or from being discharged from the electric vehicle 100 to the building of the power subscriber.

The control unit 150 may receive location and time information of the electric vehicle 100 from the location and time identification unit 110, receive driving distance information from the driving distance information storage unit 130, receive power connection time information and a power input/output record from the power measurement unit 140, and receive battery charging information from the battery management system unit 182, and may transmit location and time information, accumulated driving distance information, power connection time information, a power input/output record, a charging/discharging event log, charging/discharging record information, and the like to the wireless communication unit 120.

The display unit 152 is installed on an inside and/or an outside (for example, a glass window) of the vehicle, and may be display a signal exchange state with the mediation server (that is, whether a mediation server properly receives information transmitted from the electric vehicle, whether the electric vehicle is charged and discharged according to an intention of the mediation server, whether mediation of a power fee is not problematic, and the like) with the intermediate server for location-based power mediation, a residual power level, a charging/discharging operation state, a charging/discharging speed, and the like.

The battery management system unit 182 may check a charging level of the battery 180, and may directly control an charging/discharging operation of the battery 180 of the electric vehicle 100. In detail, the battery management system unit 182 may check a charging level of the battery 180 to transmit the battery charging information to the control unit 150, and may receive a command of the control unit 150 to directly control a charging/discharging operation of the battery 180 of the electric vehicle 100.

A power charging converter (ADC) 184 and a power discharging converter (DAC) 186 covert an AC current into a DC current and a DC current into an AC current, respectively, and make it possible to charge and discharge the battery 180.

According to the electric vehicle 100 for location-based power mediation according to an embodiment of the present invention, an electric fee may be mediated such that power may be purchased or sold in a fee-charging way between a power subscriber and a power sale company, between a power mediation company for an electric vehicle and a power sale company, and between a power mediation company for an electric vehicle and a power mediation subscriber, by charging or discharging the electric vehicle 100 only with an existing general socket 200 simply installed in a building of a power subscriber instead of installing a separate fixed unit for charging and discharging the electrical vehicle 100.

To achieve this, when the plug 190 of the electric vehicle 100 is inserted into the socket 200 of the building of the power subscriber, the electric vehicle 100 may transmit residual battery level information together with location and time information of the electric vehicle 100 to the outside through wireless communication. In detail, if the plug 190 of the electric vehicle 100 is inserted into the socket 200 of the building of the power subscriber, the power measurement unit 140 of the electric vehicle 100 may detect a power source and inform the control unit 150 of the fact. Then, the control unit 150 may give a command such that the wireless communication unit 120 transmits residual battery level information together with location and time information of the electric vehicle 100 to the outside, for example, to the intermediate server of the power mediation company through wireless communication, as will be described with reference to FIG. 2. The electric vehicle 100 also records charging/discharging level information with reference to every hour to cope with a power price difference for time sections, and may transmit the charging/discharging level information to the outside, for example, to the mediation server of the power mediation company through the wireless communication unit 120.

Figure 2:
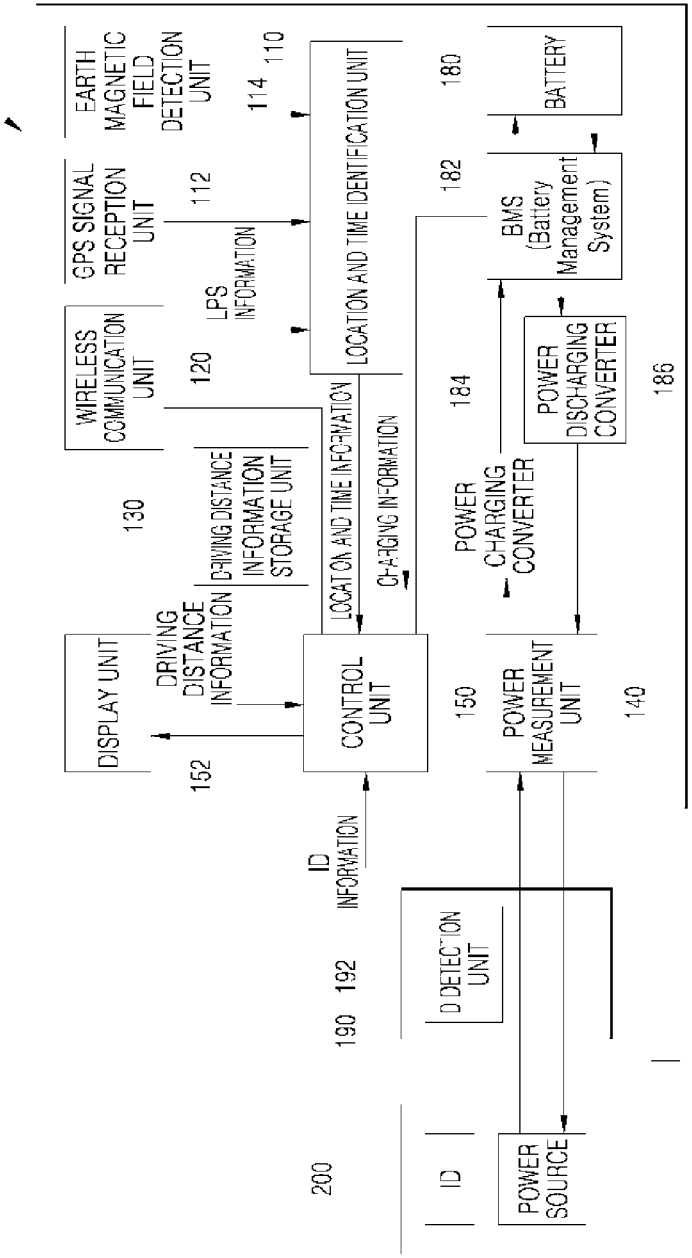
FIG. 2 is a block diagram of an electric vehicle for location-based power mediation according to another embodiment of the present invention.

Referring to FIG. 2, an electric vehicle for location-based power mediation according to another embodiment of the present invention will be described. FIG. 2 is a block diagram of an electric vehicle 102 for location-based power mediation according to another embodiment of the present invention.

The electric vehicle 102 for location-based power mediation according to another embodiment of the present invention may further include an ID detection unit 192, in addition to the component elements that have been described with reference to FIG. 1. For example, the ID detection unit 192 may be an ID reader mounted on the plug 190 of the electric vehicle 102, and the ID reader may detect an ID attached to a socket 200 of a building. A contact scheme as well as non-contact scheme such as NFC or RFID may be used to detect an ID of a building of a power subscriber.

Because the electric vehicle 102 further includes the ID detection unit 192, a precision of location information of the electric vehicle 102 may be further improved by preventing confusion of location information of the electric vehicle 102 from location information of another building that may be present within a limit of an error range, in addition to by increasing the precision of the location information of the electric vehicle 102 using a GPS satellite signal, a geomagnetic sensor signal, LPS information through communication between wireless communication base stations, and the like.

When the electric vehicle 102 further includes the ID detection unit 192, the power measurement unit 140 may allow the control unit 150 to give a turn-on or turn-off command to the ID detection unit 192 in association with detection of a power source that has been described with reference to FIG. 1. In detail, if the plug 190 of the electric vehicle 102 is inserted into the socket 200 of the building of the power subscriber, the power measurement unit 140 may detect a power source and inform the control unit 150 of the fact to allow the control unit 150 to give a command of turning on the ID detection unit 192. Similarly, if the plug 190 of the electric vehicle 102 is separated from the socket 200 of the building of the power subscriber, the power measurement unit 140 may detect the fact and inform the control unit 150 of the fact to allow the control unit 150 to give a command of turning off the ID detection unit 192.

According to the electric vehicle 102 for location-based power mediation according to another embodiment of the present invention, as described with reference to FIG. 1, a precision of identifying a location of the electric vehicle 102, a location of a building of a power subscriber, and the power subscriber may be further increased by using an ID attached to the socket 200 of the building, in addition to by using one or more of a GPS satellite signal, LPS information, and earth magnetic field information.

Figure 3:
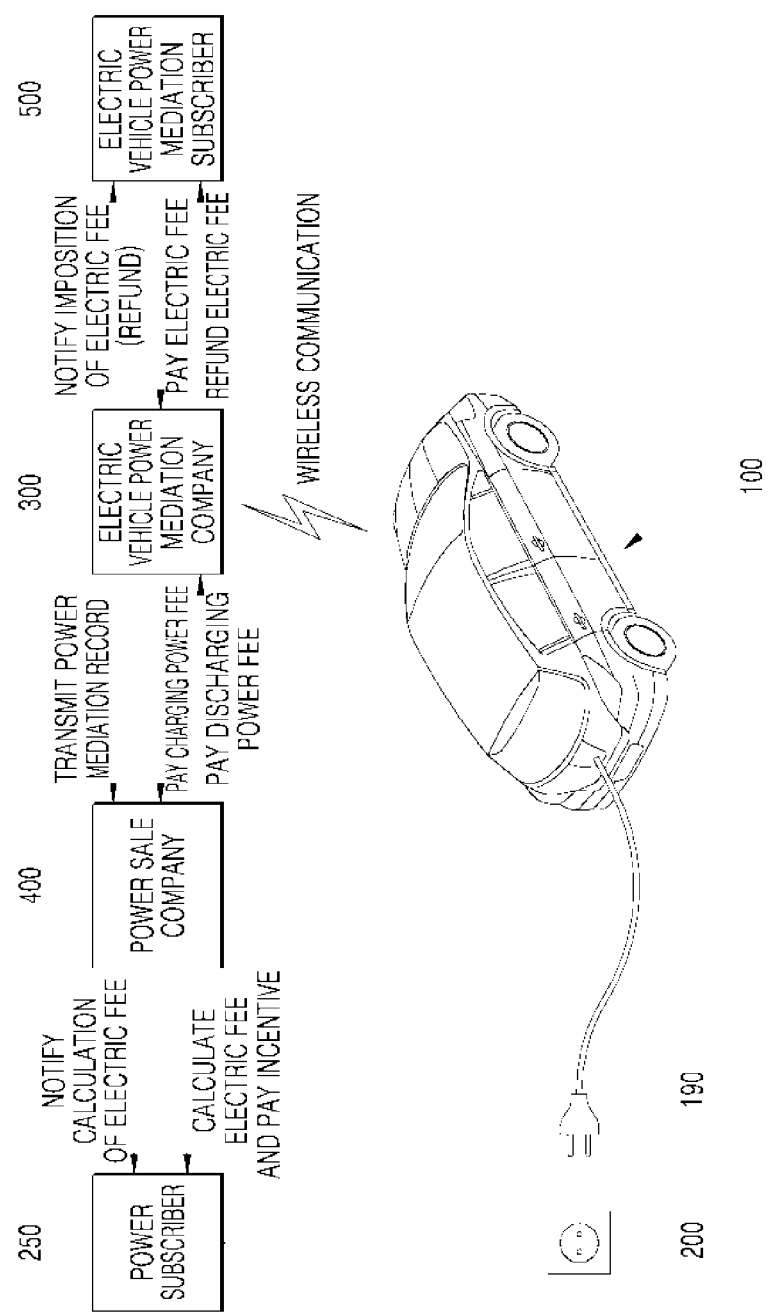
FIG. 3 illustrates a location-based charging/discharging system of an electric vehicle including an intermediate server for location-based power mediation according to an embodiment of the present invention.

Referring to FIG. 3, a location-based charging/discharging system of an electric vehicle including an intermediate server for location-based power mediation according to an embodiment of the present invention will be described. FIG. 3 illustrates a location-based charging/discharging system of an electric vehicle including an intermediate server for location-based power mediation according to an embodiment of the present invention. In FIG. 3, the electric vehicle may be the electric vehicle 100 described with reference to FIG. 1 or the electric vehicle 102 described with reference to FIG. 2.

The location-based charging/discharging system of the electric vehicle mediates power trades for charging/discharging the vehicle between an electric vehicle power mediation subscriber 500, a power mediation company for an electric vehicle 300, a power sale company 400 and a power subscriber 250.

The electric vehicle power mediation subscriber 500 may insert the plug 190 into the socket 200 of the building of the power subscriber 250 to charge or discharge the battery of the electric vehicle 100. In particular, according to the present invention, it becomes possible to identify the location of the building and the power subscriber 250 through the location and time information of the electric vehicle 100. An amount of charged or discharged power may be identified in the electric vehicle 100 even without installed a separate facility for identifying an amount of charged or discharged power in the building.

On one hand, the power mediation company 300 may transmit a power mediation record to the power sale company 400, and may pay a charging power price to the power sale company 400 or receive a discharging power price from the power sale company 400. On the other hand, the power mediation company 300 may notify the electric vehicle power mediation subscriber 500 of imposition (or refund) of an electric fee, and may receive an electric fee from the electric vehicle power mediation subscriber 500 or refund an electric fee to the electric vehicle power mediation subscriber 500.

The power sale company 400 may receive a power mediation record from the electric vehicle power mediation company 300, notify the power subscriber 250 of calculation of an electric fee based on the power mediation record, and calculate the electric fee to the power subscriber 250 and additionally provide an incentive.

In the location-based charging/discharging system for an electric vehicle described with reference to FIG. 3, the power mediation company 300 may provide a power mediation service using the intermediate server for location-based power mediation according to the present invention.

In detail, the intermediate server for power mediation may receive location and time information of the electric vehicle whose battery is charged or discharged, by inserting the plug 190 of the electric vehicle into the socket 200 of the building of the power subscriber 250, and may identify the location of the building and the power subscriber 250. Here, the location and time information of the electric vehicle may be based on one or more of a GPS satellite signal, LPS information, and an earth magnetic field information. Furthermore, the location and time information of the electric vehicle may be based on a sensor signal from one or more of the gravity sensor and the acceleration sensor included in the electric vehicle in addition to one or more of the GPS satellite signal, the LPS information, and the earth magnetic field information, which have been described above. That is, the location and time information of the electric vehicle 100 may be obtained by properly combining one or more of the GPS satellite signal, the LPS information, and the earth magnetic field information, or may be based on a sensor signal from one or more of the gravity sensor and the acceleration sensor in addition to the properly combined signal/information. When the electric vehicle of FIG. 3 is the electric vehicle 102 described with reference to FIG. 2, the mediation server may additionally receive an ID attached to the socket 200 of the building that is detected by the ID detection unit 192 mounted on the plug 190 of the electric vehicle. Accordingly, distortion on location information of the electric vehicle user that may occur when only an ID is used alone may be prevented in advance.

The mediation server may receive one or more of power connection time information of the electric vehicle 100 and an input/output record of power to calculate an electric fee for the electric vehicle 100. The mediation server may transmit a power mediation record including one or more of the power connection time information and the input/output record of power to the outside. For example, the power mediation record may be transmitted to the power sale company 400, and accordingly, it becomes possible for the power sale company 400 to calculate an electric fee for the identified power subscriber 250 based on the power mediation record.

The mediation server may receive a charging/discharging event log from the electric vehicle 100 in real time, and may verify the charging/discharging event log received in real time by once again receiving all charging/discharging event logs from a time point when the plug 190 of the electric vehicle 100 is connected to a time point when the plug 190 is separated. Here, only a charging function is operated when a communication disorder is generated in wireless communication between the electric vehicle 100 and the mediation server, and its event log is stored, and the stored event log may be transmitted to the mediation server after the communication disorder disappears.

The mediation server may crosscheck accumulated driving distance information and charging/discharging record information of the electric vehicle 100 in order to increase an accuracy of calculating a charging/discharging electric fee.

The mediation server may command a charging/discharging operation of the electric vehicle 100 according to at least one of residual battery level information received from the electric vehicle 100, central control information in accordance with a change in power demand, or a contract condition with the electric vehicle power mediation subscriber which has been made in advance. The condition of a contract with the electric vehicle power mediation subscriber 500 that was made in advance may be transmitted to the electric vehicle 100 in the form of programs on which the demand of the user, such as the respective demands in accordance with electric fee sections for time sections and a discharging condition, is reflected. For example, the electric vehicle power mediation subscriber may charge/purchase power at a low price and discharge/sell power at a high price by utilizing a difference between power prices for time sections/seasons. The mediation server may analyze an in-use pattern of the electric vehicle user, and may suggest the most effective contract condition program.

The mediation server may recognize a separation distance from a residence of the electric vehicle user, and may determine a charging/discharging program at a current power connection location and transmit the determined charging/discharging program to the electric vehicle. For example, when the current power connection location is separated from the residence by a predetermined distance or more, the electric vehicle user may prepare for a long distance drive of the electric vehicle 100 by rapidly increasing a charging level of the battery and restraining discharging of power.

The mediation server may control a charging/discharging operation of the electric vehicle 100 when the plug 190 of the electric vehicle 100 is inserted into the socket 200 of the building. For example, a central server of the power mediation company 300 may identify a state of the battery of the electric vehicle 100 in real time to convert charging and discharging states or to stop connection of power in consideration of local, nationwide, temporal power demand changes, such as uneven power generation of renewable energy, a demand rise in a specific season, and a power peak time section, and a condition of a contract with a subscriber made in advance, and the number of the control of the charging/discharging operation is not limited.

The mediation server may compare an allowable current amount of the building stored in the mediation server of the power mediation company 300 in advance with the number of connected electric vehicles, and may vary or interrupt a charging level of the electric vehicle to prevent flow of an overcurrent. The mediation server may call the electric vehicle to maintain a charging/discharging operation conversion preparation state if a reference by which conversion of charging and discharging operations is predicted is satisfied, in order to stabilize the supply of power by minimizing a time consumed for converting the charging and discharging operations.

Therefore, according to the mediation server of the present invention, so called "a smart grid" by which a power supply problem may be actively solved by using the power stored in the battery of the electric vehicle in advance in real time becomes possible. In particular, according to the electric vehicle, the mediation server, and the mediation system including the same of the present invention, because the power stored in the electric vehicle 100 may be discharged without a separate fixed facility, the power supply problem may be actively solved without investing an additional facility. For example, when blackout damage such as an interruption of a transmission and distribution network occurs, the battery of the electric vehicle is utilized as an emergency power generation facility using the power mediation system according to the present invention so that damage to a fish farm, a poultry farm, a freezing/refrigerating facility, an elevator, and the like may be minimized.

According to the electric vehicle 100 for location-based power mediation, the intermediate server for location-based power mediation, and the power mediation system including the same of the present invention, the electric vehicle 100 may be charged and discharged only with an existing general socket 200 simply installed in the building of the power subscriber 250, without installing a separate fixed apparatus for charging and discharging the electric vehicle 100. In an existing method of charging an electric vehicle, a big budget and a long time have been consumed because an additional facility had to be invested in the building of the power subscriber 250. In contrast, according to the present invention, a nationwide electric vehicle charging/discharging network may be constructed without investing an additional facility because the electric vehicle 100 may be charged and discharged only with an existing general socket 200 simply installed in the building of the power subscriber 250.

According to the electric vehicle 100 for location-based power mediation, the mediation server for location-based power mediation, and the power mediation system including the same of the present invention, a power price may be mediated such that power may be purchased or sold in a fee charging way between the power subscriber 250 and the power sale company 400, between the electric vehicle power mediation company 300 and the power sale company 500, and between the electric vehicle power mediation company 300 and the electric vehicle power mediation subscriber. In detail, according to the present invention, the user of the electric vehicle 100 may charge and discharge the electric vehicle 100 only by connecting and separating the plug 190 to and from the socket 200 without accompanying a separate payment process during a charging/discharging operation. That is, the user of the electric vehicle 100 may use a power fee product (deferred payment) that is claimed to the user of the electric vehicle 100, instead of using a separate payment process accompanied when the electric vehicle 100 is charged and discharged. In particular, the user of the electric vehicle 100 may use a product or a derivative product that may impose a fee on the electric vehicle power mediation subscriber 500 for the power used by the electric vehicle 100 irrespective of the kind of the power product to which the power subscriber 250 has subscribed. Accordingly, an electric vehicle power fee may be imposed on the electric vehicle power mediation subscriber 500 irrespective of whether the power product to which the power subscriber 250 has subscribed is for home or for business or the like. The power subscriber 250 may also receive an incentive provided by the power mediation company 300 from the power sale company 400 without being influenced by the electric fee even though the socket 200 is provided to the electric vehicle 100.

Figure 4:
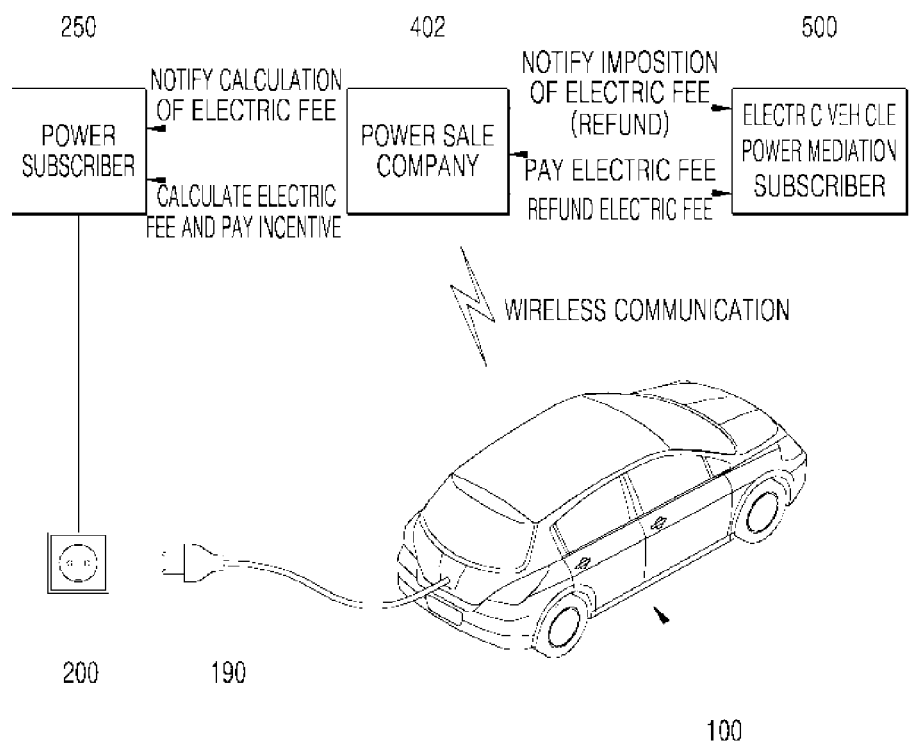
FIG. 4 illustrates a location-based charging/discharging system of an electric vehicle including an intermediate server for location-based power mediation according to another embodiment of the present invention.

Referring to FIG. 4, a location-based charging/discharging system of an electric vehicle including an intermediate server for location-based power mediation according to another embodiment of the present invention will be described. FIG. 4 illustrates a location-based charging/discharging system of an electric vehicle including an intermediate server for location-based power mediation according to another embodiment of the present invention. Hereinafter, only a difference from the location-based charging/discharging system of the electric vehicle illustrated in FIG. 3 will be described.

In the location-based charging/discharging system of the electric vehicle illustrated in FIG. 4, the power sale company 402 further performs a function of the power mediation company 300 for the electric vehicle of FIG. 3 using the mediation server for location-based power mediation.

In detail, on one hand, the power sale company 402 may directly make a power mediation record, and may notify the electric vehicle power mediation subscriber 500 of imposition (or refund) of an electric fee based on the power mediation record, or may receive an electric fee from the electric vehicle power mediation subscriber 500 or refund an electric fee to the electric vehicle power mediation subscriber 500. On the other hand, the power sale company 402 may notify the power subscriber 250 of calculation of an electric fee based on the directly made power mediation record, and calculate the electric fee to the power subscriber 250 and additionally provide an incentive.

Figure 5:
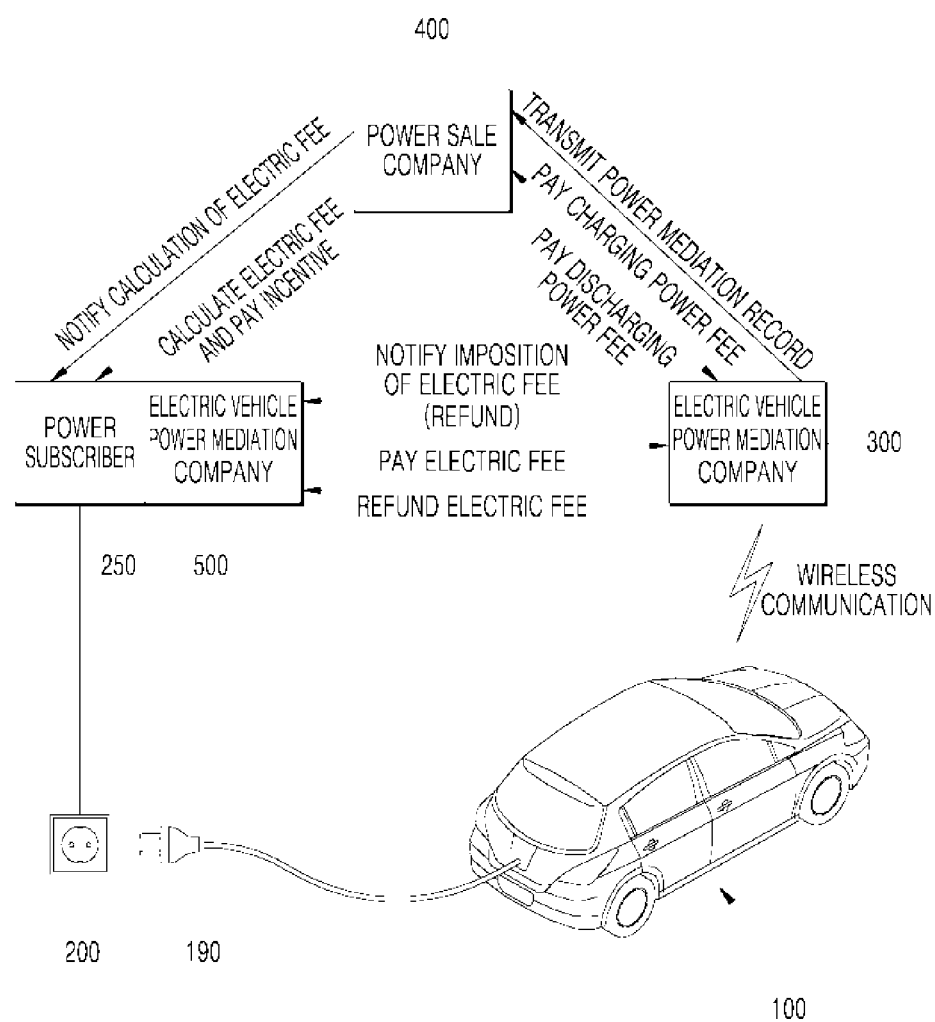
FIG. 5 illustrates a location-based charging/discharging system of an electric vehicle including an intermediate server for location-based power mediation according to still another embodiment of the present invention.

Referring to FIG. 5, a location-based charging/discharging system of an electric vehicle including an intermediate server for location-based power mediation according to still another embodiment of the present invention will be described. FIG. 5 illustrates a location-based charging/discharging system of an electric vehicle including an intermediate server for location-based power mediation according to still another embodiment of the present invention.

The location-based charging/discharging system of the electric vehicle illustrated in FIG. 5 corresponds to a case where the electric vehicle power mediation subscriber 500 is the same as the power subscriber 250 in the location-based charging/discharging system of the electric vehicle illustrated in FIG. 3. Because the actual power mediation is implemented in the same or similar scheme to that of FIG. 3 except for the point, a detailed description thereof will be omitted.

Figure 6:
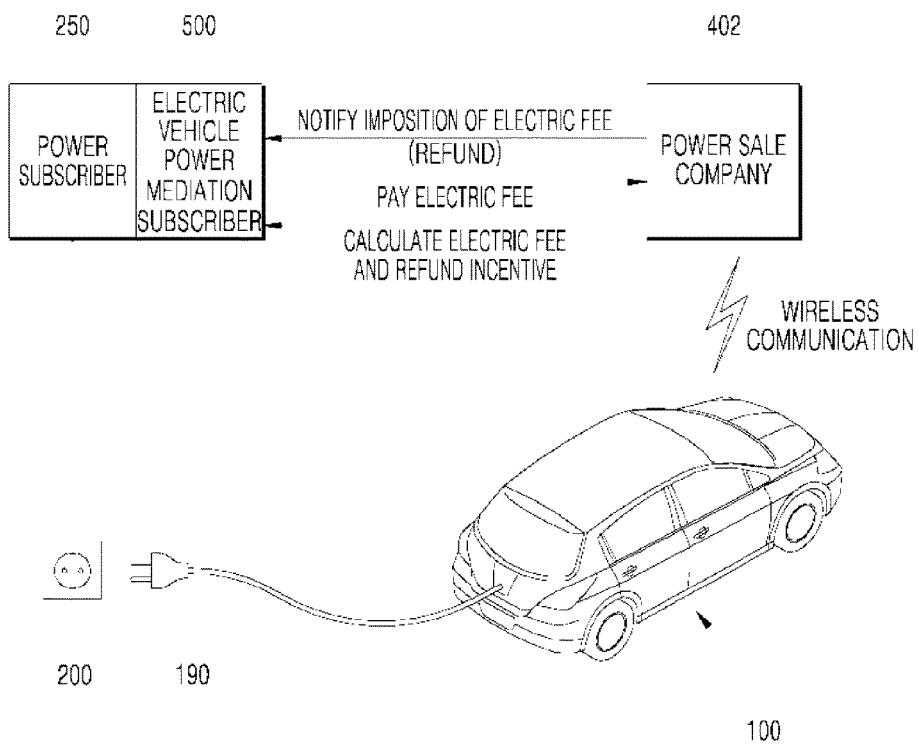
FIG. 6 illustrates a location-based charging/discharging system of an electric vehicle including an intermediate server for location-based power mediation according to still another embodiment of the present invention.

Referring to FIG. 6, a location-based charging/discharging system of an electric vehicle including an intermediate server for location-based power mediation according to still another embodiment of the present invention will be described. FIG. 6 illustrates a location-based charging/discharging system of an electric vehicle including an intermediate server for location-based power mediation according to still another embodiment of the present invention.

The location-based charging/discharging system of the electric vehicle illustrated in FIG. 6 corresponds to a case where the electric vehicle power mediation subscriber 500 is the same as the power subscriber 250 in the location-based charging/discharging system of the electric vehicle illustrated in FIG. 4. Because the actual power mediation is implemented in the same or similar scheme to that of FIG. 4 except for the point, a detailed description thereof will be omitted.

2. User Authentication Socket or Connector Used In Power Mediation System

The user authentication socket or connector, the power mediation connector, and the electric vehicle using the same according to the present invention, which will be described below, may be applied, in particular, to the above-described power mediation system. According to the application, in the location-based power mediation system, as will be made clear by the following description, the building owner may share a socket for an electric vehicle for mediation of power without any concern because standby power costs may be completely eliminated while a security problem is solved. The user authentication socket or connector according to the present invention may take, for example, the form of a socket which may be installed in a wall of a building or the form of a connector such as a cable extracted from a wall of a building. Hereinafter, it will be described only for convenience of description that the user authentication socket or connector according to the present invention is a socket.

Figure 7:
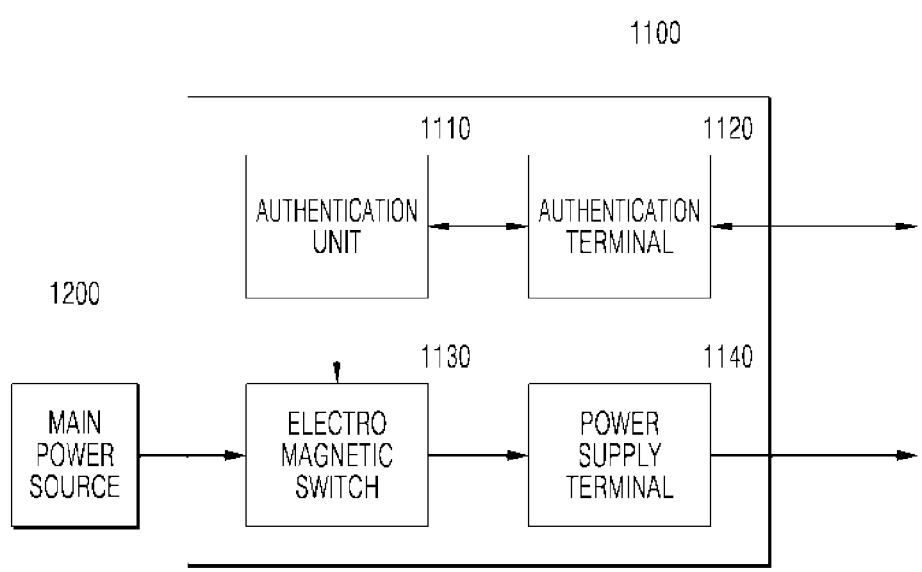
FIG. 7 is a block diagram illustrating a user authentication socket or connector according to a first embodiment of the present invention.

Referring to FIG. 7, a user authentication socket or connector according to a first embodiment of the present invention will be described.

The user authentication socket 1100 according to the first embodiment of the present invention may include an authentication unit 1110, an authentication terminal 1120, an electromagnetic switch 1130, and a power supply terminal 1140. If a plug (see FIGS. 9 and 10) of a power mediation connector or a power demand unit (for example, an electronic vehicle) is inserted into the user authentication socket 1100, authentication power starts to be supplied from the plug to the authentication unit 1110 through the authentication terminal 1120 of the socket 1100. Also, the plug transmits a socket ID request signal to the socket 1100, and receives socket ID information from the socket 1100. The socket ID identification procedure may be performed by attaching an RFID or NFC to the socket 1100, installing a RFID or NFC reader in the plug, and directly reading socket ID information from the socket 1100. Here, when a fluidic key value is transmitted to the plug side together with socket ID information, security may be additionally reinforced. After acquiring the socket ID information, the plug side acquires a socket operation secret code through a database stored in the plug or through wireless communication with the outside (for example, an authentication server of FIGS. 9 and 10). The plug side transmits the acquired socket operation secret code to the socket 1100, and then, the authentication unit 1110 of the socket 1100 identifies the socket operation secret code and starts supply of main power by closing the electromagnetic switch 1130 if the secret code is correct. The power from the main power source 1200 may be provided to the plug side through the power supply terminal 1140. If the plug is separated from the socket 1100, the supply of authentication power to the authentication unit 1110 through the authentication terminal 1120 is ended, and the supply of main power is interrupted as the electromagnetic switch 1130 is opened.

Figure 8:
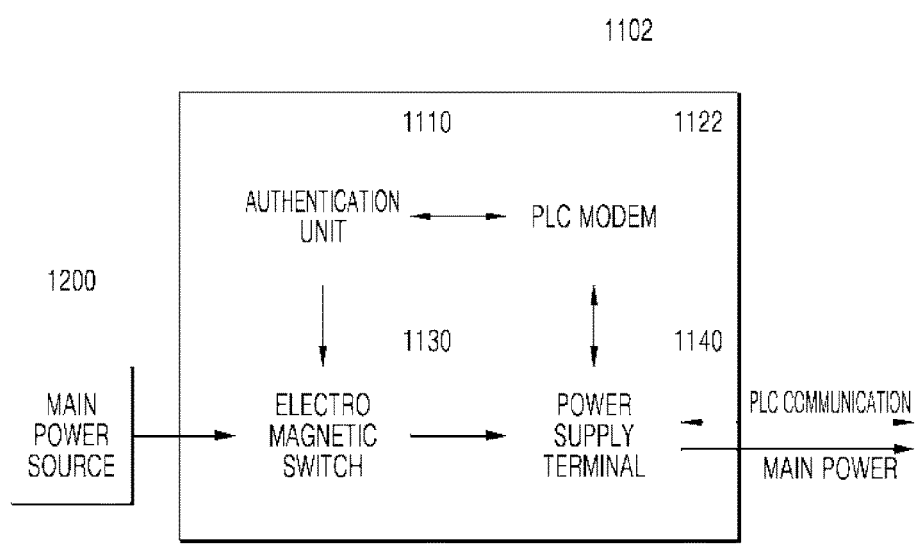
FIG. 8 is a block diagram illustrating a user authentication socket or connector according to a second embodiment of the present invention.

Referring to FIG. 8, a user authentication socket or connector according to a second embodiment of the present invention will be described.

The user authentication socket 1102 according to the second embodiment of the present invention may include an authentication unit 1110, a PLC modem (a power line communication modem) 1122, an electromagnetic switch 1130, and a power supply terminal 1140. The user authentication socket 1102 according to the second embodiment of the present invention includes the PLC modem 1122 instead of the authentication terminal 1120 of the first embodiment, and undergoes a user authentication procedure using PLC (power line communication). Because the operational principles of initiating supply of authentication power to the authentication unit 1110, identifying an ID of a socket, acquiring an operation secret code of the socket, supplying power from a main power source to the plug side, interrupting supply of authentication power to an authentication unit, and interrupting supply of power from a main source to the plug side are substantially the same or similar to those of the first embodiment, a detailed description thereof will be omitted for convenience of description.

Figure 9:
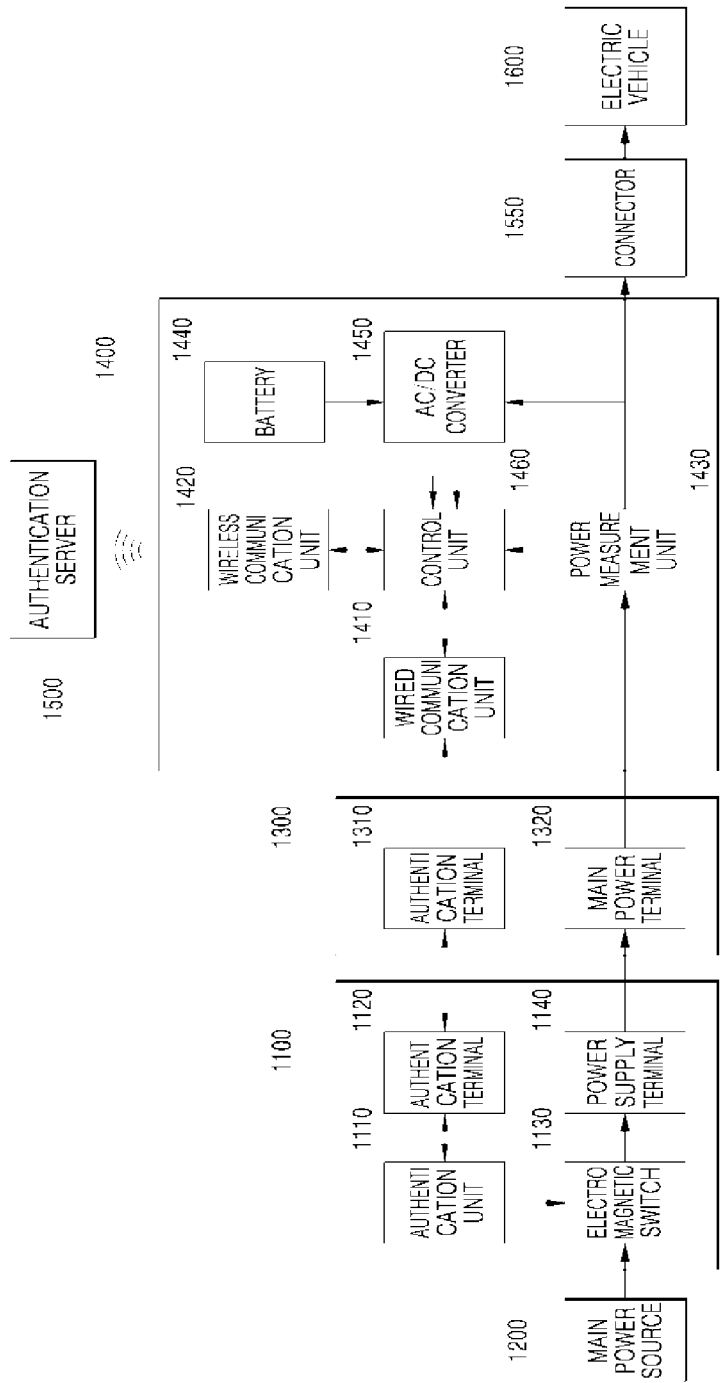
FIG. 9 is a block diagram illustrating a connector for location-based power mediation according to an embodiment of the present invention.

Referring to FIG. 9, a power mediation connector according to a first embodiment of the present invention will be described. Although FIG. 9 illustrates that an electric vehicle receives power using the user authentication socket or connector according to the first embodiment of the present invention, it is apparent that the user authentication socket or connector according to the second embodiment of the present invention may be used.

The electric vehicle 1600 illustrated in FIG. 9 may receive necessary power using the user authentication socket or connector 1100 via a power mediation connector 1400 connected to the electric vehicle 1600 through a connector 1550. The power mediation connector 1400 may include a wired communication unit 1410, a wireless communication unit 1420, a power measurement unit 1430, a battery 1440, an AC/DC converter 1450, and a control unit 1460.

The wired communication unit 1410 transmits and receives a signal/information (for example, a socket ID request signal, socket ID information, and a socket operation secret code) that is necessary in the process of initiating supply of authentication power to the authentication unit 1110, identifying an ID of the socket, and acquiring an operation secret code of the socket between the control unit 1460 of the power mediation connector 1400 and the authentication terminal 1310 of the plug 1300. Meanwhile, differently from those illustrated in FIG. 9, the operation secret code of the socket may be acquired from a database stored in the power mediation connector 1400 or the electric vehicle 1600. However, if the number of the user authentication sockets becomes larger, it may be difficult to store all operation secret codes of the sockets in the power mediation connector 1400 or the electric vehicle 1600. Accordingly, the power mediation connector 1400 may acquire an operation secret code of the socket from an authentication server 1500 located on the outside through the wireless communication unit 1420 in a process of acquiring the operation secret code of the socket. If the operation secret code of the socket is acquired from the outside in this way, a danger of release of a database of all operation secret codes of the sockets that may occur when the authentication server 1500 is not separately managed may be reduced.

The power measurement unit 1430 measures an amount of power supplied from the user authentication socket 1100 via the power supply terminal 1320 of the plug 1300. The measured power is supplied to the electric vehicle 1600 connected to the power mediation connector 1400 by the connector 1550. At the same time, the measured power is sent to the control unit 1460. Based on the measured power, through wireless communication via the wireless communication unit 1420, an electric fee that will be imposed on the owner of an electric vehicle and/or an electric fee that will be notified of to a power supplier (for example, the owner of a building) may be calculated and payment of an incentive may be determined.

The battery 1440 may provide authentication power (DC power) to the user authentication socket 1110 via the control unit 1460 before an actuation of the power mediation connector 1440. Once the user authentication socket 1110 starts to supply power, the battery 1440 may be charged by converting the power previously measured through the power measurement unit 1430 into DC power through the AC/DC converter 1450 or the converted DC power may be provided to the user authentication socket 1100 as authentication power via the control unit 1460.

Figure 10:
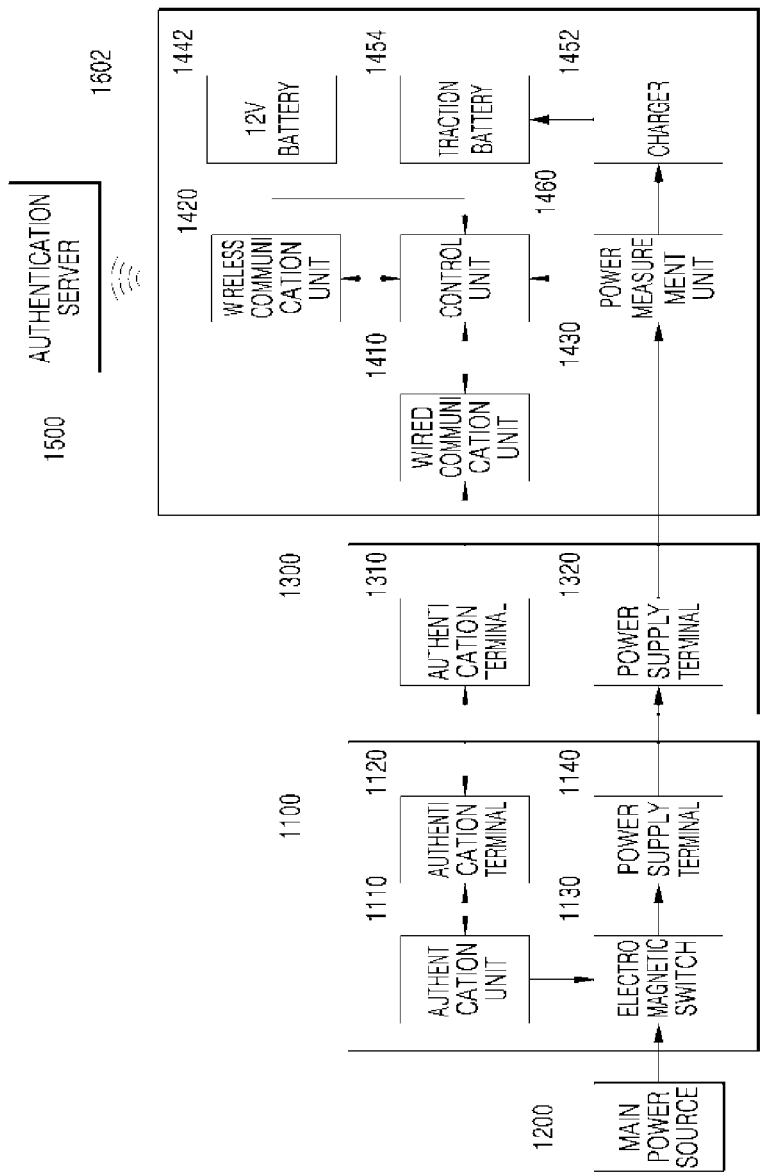
FIG. 10 is a block diagram illustrating a power demand apparatus according to an embodiment of the present invention.

Referring to FIG. 10, a power demand unit according to an embodiment of the present invention will be described. Although FIG. 10 illustrates that an electric vehicle uses the user authentication socket or connector according to the first embodiment of the present invention, it is apparent that the user authentication socket or connector according to the second embodiment of the present invention may be used.

The electric vehicle 1602 illustrated in FIG. 10 itself includes the wired communication unit 1410, the wireless communication unit 1420, the power measurement unit 1430, and the control unit 1460 included in the power mediation connector described with reference to FIG. 9. Because the operational principles are substantially the same or similar to those described with reference to FIG. 9, a detailed description thereof will be omitted for convenience of description and a difference from FIG. 9 will be mainly described.

In the electric vehicle 1602 illustrated in FIG. 10, a battery (for example, a 12 V battery) 1442 for electric parts in the electric vehicle may provide authentication power (DC power) to the authentication socket 1100 via the control unit 1460. The battery (for example, a 12 V battery) 1442 for electric parts is a battery used to operate electric parts in the electric vehicle. The power measured via measurement of power may be converted into DC power in a charger 1452 of the electric vehicle 1602 and may be stored in a traction battery 1454. The traction battery 1454 is a driving battery of the electric vehicle 1602.

According to the user authentication socket or connector, the power mediation connector, and the power demand unit (for example, an electric vehicle) using the same of the present invention, which have been described above, because the user is identified and authenticated using a power source on the outside of the socket (for example, the battery 1440 of the power mediation connector 1400 in the embodiment illustrated in FIG. 9 and the battery 1442 for electric parts in the embodiment illustrated in FIG. 10) and the socket supplies power from the main power source, standby power is not consumed at all in the main power source side while connection to the power demand unit (for example, an electric vehicle) is stood by. That is, power may be supplied only to a user to which use has been allowed in advance while power for authentication of a user is not wasted in a normal situation. Furthermore, an additional mechanical locking unit for preventing illegal use of a socket or connector is not necessary. In addition, as described above in relation to the embodiment of FIG. 7, the security of the socket may be further reinforced when the socket authentication unit generates sequentially changed key values.

Furthermore, a feeding unit for charging an electric vehicle according to the prior art occupies a large volume, and requires a communication unit, a user authentication unit, and a DC power supply unit for managing them in the interior of the feeding unit. However, according to the user authentication socket or connector, the power mediation connector, and the power demand unit (for example, an electric vehicle) using the same of the present invention, a power supply unit for managing a communication unit and a user authentication unit is arranged outside the socket, for example, in the form of the wired communication unit 1410, the wireless communication unit 1420, and the battery 1440 of the power mediation connector 1400 in the embodiment illustrated in FIG. 9 and in the form of the wired communication unit 1410, the wireless communication unit 1420, and the battery 1442 for electric parts of the electric vehicle 1602 in the embodiment illustrated in FIG. 10 and only the user authentication unit may be arranged in the socket or connector. Accordingly, the security may be maintained while the structure of the fixed apparatus, that is, the user authentication socket or connector is minimized.

Next, the user authentication socket or connector, the power mediation connector, and the power demand unit (for example, an electric vehicle) using the same according to the present invention may have the following values actually or commercially.

Assuming that ten electric vehicles are charged in a basement parking lot having one hundred parking surfaces, ten electric vehicle dedicated parking surfaces are required due to a standby power consumption problem and an installation cost problem according to a feeding unit according to the prior art. Accordingly, because dedicated parking surfaces for the users of electric vehicles should be equipped, inconveniences may be caused to all of the electric vehicle users and general vehicle users.

However, according to the user authentication socket or connector of the present invention, installation costs are inexpensive and consumption of standby power is not influenced at all even though the sockets or connectors are installed in all the parking surfaces. Accordingly, because parking lots for electric vehicles and parking lots for general vehicles do not need to be divided, all vehicle users can conveniently park their vehicles, and electric vehicle users can charge electric vehicles irrespective of places, that is, without finding electric vehicle dedicated parking surfaces.

Although the exemplary embodiments of the present invention have been described with reference to the accompanying drawings, it will be understood by those skilled in the art to which the present invention pertains that the present invention can be carried out in other detailed forms without changing the technical spirits and essential features thereof. Therefore, the above-described embodiments are exemplary in all aspects, and should be construed not to be restrictive.

The invention claimed is:

1. A module for location-based power mediation comprising:
    a location and time identification unit that identifies a location of an electric vehicle and a time at the location of the electric vehicle;
    a power measurement unit that monitors input/output power to/from the electric vehicle in real time; and
    a wireless communication unit that transmits location and time information concerning the location and the time at the location of the electric vehicle and information on the input/output power to an intermediate server,
    wherein an electric vehicle power mediation subscriber charges/discharges a battery of the electric vehicle through a building of a power subscriber by inserting a plug of the electric vehicle into a socket of the building of the power subscriber,
    wherein a location of the building and the power subscriber are identified from the location and time information of the electric vehicle transmitted to the intermediate server,
    wherein an amount of an electric energy to/from the electric vehicle for time sections is obtained from the information on the input/output power transmitted to the intermediate server,
    wherein an amount of an electric energy to/from the building or an amount of an electric energy to/from the building for time sections is obtained from the measured amount of the electric energy to/from the building which is measured by an electric power seller between the power subscriber and the electric vehicle power mediation subscriber aside from the obtaining the amount of the electric energy to/from the electric vehicle and
    wherein an electric fee which has been accumulated during a predetermined period for the electric vehicle power mediation subscriber is imposed or refunded independently of an electric fee for the identified power subscriber which has been accumulated during the predetermined period and is charged by the electric power seller by means of adjusting the amount of the electric energy to/from the building or the amount of the electric energy to/from the building for time sections in accordance with the amount of the electric energy to/from the electric vehicle for time sections.

2. The module of claim 1,
    wherein the accumulated electric fee imposition or refund can be performed based on a different electric tariff system from that applied to the accumulated electric fee for the identified power subscriber.

3. The module of claim 1,
    wherein the electric power seller measures the amount of the electric energy to/from the building in order to obtain the amount of the electric energy to/from the building or the amount of the electric energy to/from the building for time sections and wherein an electric power intermediary having the intermediate server on the one hand helps the electric power seller to charge the accumulated electric fee to the identified power subscriber and on the other hand imposes/refunds the accumulated electric fee on/to the electric vehicle power mediation subscriber.

4. The module of claim 1, wherein an electric power seller can perform the electric energy amount calculation for the building and the accumulated electric fee calculation for the identified power subscriber even though the identified power subscriber does not contract with an electric power intermediary having the intermediate server.

5. An electric vehicle for location-based power mediation comprising:
 a location and time identification unit that identifies a location of the electric vehicle and a time at the location of the electric vehicle;
 a power measurement unit that monitors input/output power to/from the electric vehicle in real time; and
 a wireless communication unit that transmits location and time information concerning the location and time at the location of the electric vehicle and information on the input/output power to an intermediate server,
 wherein an electric vehicle power mediation subscriber charges/discharges a battery of the electric vehicle through a building of a power subscriber by inserting a plug of the electric vehicle into a socket of the building of the power subscriber, wherein a location of the building and the power subscriber are identified from the location and time information of the electric vehicle transmitted to the intermediate server,
 wherein an amount of an electric energy to/from the electric vehicle for time sections is obtained from the information on the input/output power transmitted to the intermediate server,
 wherein an amount of an electric energy to/from the building or an amount of an electric energy to/from the building for time sections is obtained from the measured amount of the electric energy to/from the building which is measured by an electric power seller between the power subscriber and the electric vehicle power mediation subscriber aside from the obtaining the amount of the electric energy to/from the electric vehicle and
 wherein an electric fee which has been accumulated during a predetermined period for the electric vehicle power mediation subscriber is imposed or refunded independently of an electric fee for the identified power subscriber which has been accumulated during the predetermined period and is charged by the electric power seller by means of adjusting the amount of the electric energy to/from the building or the amount of the electric energy to/from the building for time sections in accordance with the amount of the electric energy to/from the electric vehicle for time sections.

6. An intermediate server for location-based power mediation,
 wherein, from an electric vehicle whose plug is inserted into a socket of a building of a power subscriber for charging/discharging a battery of the electric vehicle by an electric vehicle power mediation subscriber, the intermediate server receives (i) location and time information concerning a location of the electric vehicle and a time at the location of the electric vehicle and (ii) information on the input/output power to/from the electric vehicle through a wireless communication,
 wherein a location of the building and the power subscriber are identified based on location and time information of the electric vehicle which are transmitted to the intermediate server,
 wherein an amount of an electric energy to/from the electric vehicle for time sections is obtained from the information on the input/output power transmitted to the intermediate server,
 wherein an amount of an electric energy to/from the building or an amount of an electric energy to/from the building for time sections is obtained from the measured amount of the electric energy to/from the building which is measured by an electric power seller between the power subscriber aside from the obtaining the amount of the electric energy to/from the electric vehicle and
 wherein an electric fee which has been accumulated during a predetermined period for the electric vehicle power mediation subscriber is imposed or refunded independently of an electric fee for the identified power subscriber which has been accumulated during the predetermined period and is charged by the electric power seller by means of adjusting the amount of the electric energy to/from the building or the amount of the electric energy to/from the building for time sections in accordance with the amount of the electric energy to/from the electric vehicle for time sections.

7. The intermediate server of claim 6, wherein the accumulated electric fee imposition or refund can be performed based on a different electric tariff system from that applied to the accumulated electric fee for the identified power subscriber.

8. The intermediate server of claim 6, wherein the electric power seller measures the amount of the electric energy to/from the building in order to obtain the amount of the electric energy to/from the amount of the building or the electric energy to/from the building for time sections and wherein an electric power intermediary having the intermediate server on the one hand helps the electric power seller to charge the accumulated electric fee to the identified power subscriber and on the other hand imposes/refunds the accumulated electric fee on/to the electric vehicle power mediation subscriber.

9. The intermediate server of claim 6, wherein an electric power seller can perform the electric energy amount calculation for the building and the accumulated electric fee calculation for the identified power subscriber even though the identified power subscriber does not contract with an electric power intermediary having the intermediate server.

10. The intermediate server of claim 6, wherein the intermediate server commands a charging/discharging operation of the electric vehicle according to one or more of residual battery level information received from the electric vehicle, central control information in accordance with a change in demand on power, or a condition of a contract with an electric vehicle power mediation subscriber made in advance.

11. A user authentication socket or connector comprising:
 an authentication terminal that receives authentication power and a socket operation secret code for authentication of a user; and an authentication unit that is operated by the authentication power and determines whether the socket operation secret code corresponds to socket ID information, wherein the authentication power is supplied from a power demand unit side, not from a main power source via the authentication terminal, wherein supplying the authentication power to the authentication unit is initiated by inserting a plug at the power demand unit side into the socket or the connector so that a closed loop is established, and wherein power for the power demand unit is supplied from the main power source to the outside if the socket operation secret code corresponds to the socket ID information.

12. The user authentication socket or connector of claim 11, wherein the socket or connector receives a socket ID request signal from the power demand unit side and transmits socket ID information to the power demand unit side and wherein the power demand unit side obtains the socket operation secret code corresponding to the socket ID information and transmits the obtained socket operation secret code to the authentication terminal.

13. The user authentication socket or connector of claim 11, wherein if a plug is separated from the socket or connector, supply of authentication power through the authentication terminal is ended so that supply of power from the main power source is interrupted.

14. A user authentication socket or connector comprising:

a power line communication modem that receives authentication power and a socket operation secret code for authentication of a user; and an authentication unit that is operated by the authentication power and determines whether the socket operation secret code corresponds to socket ID information, wherein the authentication power is supplied from a power demand unit side, not from a main power source through power line communication, wherein supplying the authentication power to the authentication unit is initiated by inserting a plug at the power demand unit side into the socket or the connector so that a closed loop is established, and wherein power for the power demand unit is supplied from the main power source to the outside if the socket operation secret code corresponds to the socket ID information.

15. The user authentication socket or connector of claim 14, wherein the socket or connector receives a socket ID request signal from the power demand unit side and transmits socket ID information to the power demand unit side, and wherein the power demand unit side obtains the socket operation secret code corresponding to the socket ID information and transmits the obtained socket operation secret code to the authentication terminal.

16. The user authentication socket or connector of claim 14, wherein if a plug is separated from the socket or connector, supply of authentication power through the power line communication modem is ended so that supply of power from the main power source is interrupted.

17. A power mediation connector for receiving power from a user authentication socket or connector in accordance with claim 11 and supplying the power to a power demand unit, the power mediation connector comprising: a battery for supplying the authentication power to the authentication unit.

18. A power mediation connector for receiving power from a user authentication socket or connector in accordance with claim 14 and supplying the power to a power demand unit, the power mediation connector comprising: a battery for supplying the authentication power to the authentication unit.

19. A power demand unit that receives power from a user authentication socket or connector in accordance with claim 11, the power demand unit comprising: a battery for electric parts, for supplying the authentication power to the authentication unit.

20. A power demand unit that receives power from a user authentication socket or connector in accordance with claim 14, the power demand unit comprising: a battery for electric parts, for supplying the authentication power to the authentication unit.

* * * * *